United States Patent
Moore et al.

(10) Patent No.: US 7,634,557 B2
(45) Date of Patent: Dec. 15, 2009

(54) APPARATUS AND METHOD FOR NETWORK ANALYSIS

(75) Inventors: Todd A. Moore, McLean, VA (US); Mark E. Longworth, Sterling, VA (US); Brian Girardi, McLean, VA (US); Damon Love, McLean, VA (US)

(73) Assignee: NetWitness Corporation, Herndon, VA (US)

( * ) Notice: Subject to any disclaimer, the term of this patent is extended or adjusted under 35 U.S.C. 154(b) by 1612 days.

(21) Appl. No.: 10/133,392

(22) Filed: Apr. 29, 2002

(65) Prior Publication Data

US 2002/0163934 A1    Nov. 7, 2002

Related U.S. Application Data

(60) Provisional application No. 60/286,966, filed on Apr. 30, 2001.

(51) Int. Cl.
*G06F 15/173* (2006.01)
(52) U.S. Cl. .................. 709/224; 709/236; 709/246
(58) Field of Classification Search ............. 709/223, 709/224, 230, 235, 245, 236, 246
See application file for complete search history.

(56) References Cited

U.S. PATENT DOCUMENTS

| | | | |
|---|---|---|---|
| 5,191,525 A | 3/1993 | LeBrun et al. | |
| 5,297,039 A | 3/1994 | Kanaegami et al. | |
| 5,319,453 A | 6/1994 | Copriviza et al. | |
| 5,327,544 A | 7/1994 | Lee et al. ................ 716/18 | |
| 5,475,838 A | 12/1995 | Fehskens et al. | |
| 5,495,607 A | 2/1996 | Pisello et al. | |
| 5,568,471 A | 10/1996 | Hershey et al. | |
| 5,673,252 A | 9/1997 | Johnson et al. | |
| 5,696,899 A | 12/1997 | Kalwitz | |
| 5,715,397 A | 2/1998 | Ogawa et al. | |
| 5,787,253 A | 7/1998 | McCreery et al. | |
| 5,790,799 A | 8/1998 | Mogul | |
| 5,796,942 A * | 8/1998 | Esbensen .................. 726/13 | |
| 5,802,303 A | 9/1998 | Yamaguchi | |
| 5,819,034 A | 10/1998 | Joseph et al. | |
| 5,825,775 A | 10/1998 | Chin et al. | |
| 5,835,726 A | 11/1998 | Shwed et al. | |
| 5,848,233 A | 12/1998 | Radia et al. | |
| 5,850,523 A | 12/1998 | Gretta, Jr. | |
| 5,892,900 A | 4/1999 | Ginter et al. | |
| 5,982,994 A | 11/1999 | Mori et al. | |
| 6,021,437 A | 2/2000 | Chen et al. | |
| 6,269,447 B1 | 7/2001 | Maloney et al. | |
| 6,370,587 B1 * | 4/2002 | Hasegawa et al. ........... 709/245 | |
| 6,529,954 B1 * | 3/2003 | Cookmeyer et al. ......... 709/224 | |

OTHER PUBLICATIONS

International Search Report, Oct. 16, 2000.

(Continued)

*Primary Examiner*—Patrice Winder
*Assistant Examiner*—Adnan Mirza
(74) *Attorney, Agent, or Firm*—Edell, Shapiro & Finnan, LLC

(57) ABSTRACT

A system for and method of extracting information from multiple sessions of disparate protocols into a common language is disclosed. A method of creating a record conforming to an event-based language is also disclosed. A system configured to create a record conforming to an event-based language is also disclosed.

13 Claims, 12 Drawing Sheets

OTHER PUBLICATIONS

Almeroth, Kevin et al., "Multicast Group Behavior in the Internet's Multicast Backbone (MBone)", IEEE Communication Magazine, Jun. 1997, pp. 124-129.

K. Hatonen et al., "Knowledge Discovery from Telecommunication Network Alarm Databases", University of Helsinki, IEEE, 1996, pp. 115-122.

NID Introduction, "1.0 Introduction", May 21, 1999, pp. 1-7.

Lunt, Teresa et al. "DARPA's Intrusion Detection and Response Research Efforts".

Pallatto, John, "Keep Tabs on Who's Beating a Path to Your Site", www.ibizmag.com, Dec. 1998.

Cassidy, Peter, "Beaching Surfers", www.cio.com/archive/webusiness.

Ranum, Marcus et al., "Implementing a Generalized Tool for Network Monitoring", Network Flight Recorder, Inc.

"SessionWall-3TM, the Next Generation of Internet and Intranet Protection," May 21, 1999.

IBM Tech. Disc. Bull., "Parci Architecture", vol. 38, Issue 3, Mar. 1, 1995, pp. 13-18.

International Search Report Dated Sep. 12, 2002.

* cited by examiner

Format 1: <ENTITY> was seen <ACTION> to <ENTITY2> with <SERVICE TYPE>

Format 2: <ENTITY1a, ENTITY1b> was seen <ACTION> to <ENTITY2a, ENTITY2b> with <SERVICE TYPE>

For example:

<USER TODD> was seen <SENDING MESSAGE> to <USER DAMON> with <SMTP>

-or-

<COMPUTER 192.168.1.12, USER TODD> was seen <GETTING RESOURCE> from <COMPUTER 192.168.1.1, RESOURCE: /etc/passwd> using <FTP>

<NAME> <VALUE>

SUBJECT "IMPORTANT INFORMATION, PLEASE READ "

PASSWORD "test12"

APPLICATION "Outlook Express"

ROUTES: <COMPUTER 192.168.1.12> to <COMPUTER 192.168.1.1>

ALIAS:<192.168.1.12>, <FORENSICSEXPLORERS.COM> todd@forensicsexplorers.com, <Todd Moore>

```
HTTP/1.1 200 OK
Server: Microsoft-IIS/5.0
Date: Thu, 17 Jan 2002 20:59:59 GMT
Content-Length: 1031
Content-Type: text/html
Cache-control: private <HTML>
<HEAD>
<META NAME="GENERATOR" Content="Microsoft Visual Studio 6.0">
<TITLE>Welcome to the Matrix</TITLE>
</HEAD>
<BODY bgcolor=#000000 text=#00ff00>

<P>
<img src='images/pill.gif'>
<H1 align=center>Matrix Mainframe</H1>
<P></P>
<P>
<FORM action="login.asp" method=post id=form1 name=form1>

<form action="login.asp" method="post" name="form">
        <table border="0" cellPadding="1" cellSpacing="1" width="75%">
    <tr>
            <td width=200>
                    <div align="right">Username:</div>
            </td>
        <td>
        <INPUT id="username" name="username" size=15 maxLength=15 >
            </td>
    </tr>
    <tr>
        <td>
           <div align="right">Password:</div>
        </td>
        <td>
     <INPUT type="password" id="password" name="password" size=15 maxLength=15>

</td>
        </tr>
        <tr>
        <td>
        </td>
        <td align=right>
        <input type="submit" value="Login" id="submit" name="submit">
        </td></tr>
</table>
</form></P>
</BODY>
</HTML>
```

Figure 10

```
HELO morpheus
MAIL FROM: <morpheus@frontline.com>
RCPT TO: <neo@frontline.com>
DATA
Message-ID: <001901c19f8d$2d3f41d0$0200a8c0@moore>
From: "Mr. Morpheus" <morpheus@frontline.com>
To: "The One" <neo@frontline.com>
Subject: Virus for the Matrix
Date: Thu, 17 Jan 2002 14:28:44 -0500
X-Mailer: Microsoft Outlook Express Neo, I'll send you the virus attachment in a follow-up e-mail. Once you have it
please install into the Matrix using the application of your choice.

Good Luck!

Morpheus
```

Figure 11a

```
USER administrator
PASS matrix
TYPE I
PORT 192,168,0,2,12,200
STOR virus.exe
QUIT
```

```
S:10010,80,1140858881,15615,1010888027,0,1223
E:101,209.123.16.2:80,101,192.168.0.4:4086,1
E:101,209.123.16.2:80,101,192.168.0.4:4086,120
P:response,200 OK
P:server,Microsoft-IIS/5.0
P:title,Welcome to the Matrix
P:content,0;1223;text/html
S:10020,25,1140868610,5742,1011011324,1223,1739
E:101,192.168.0.3:3263,101,192.168.0.1:25,1
E:202,frontline.com:morpheus,202,frontline.com:neo,30
P:subject,Virus for the Matrix
P:app,Microsoft Outlook Express
P:name,Mr. Morpheus
A:1100,morpheus@frontline.com,Mr. Morpheus
P:content,140;516;message/rfc822
E:202,frontline.com:morpheus,202,frontline.com:neo,30
P:name,The One
A:1100,neo@frontline.com,The One
S:10030,21,1140868610,87,1011141544,1739,1827
E:101,192.168.0.2:3271,101,209.123.16.2:21,1
E:102,192.168.0.2:administrator,101,209.123.16.2:21,10
P:password,matrix
E:102,192.168.0.2:administrator,103,209.123.16.2:virus.exe,21
```

Figure 12a

```
S:<session#>,<apptype>,<network flags>,<size>,<timestamp>,<start offset>,<stop
offset>
P:<global prop name>,<value>
P:<global prop name>,<value>
E:<source type>,<source name:subname>,<target type>,<target
name:subname>,<action>,<optional timestamp>
P:<event property name>,<event property value>
A:<alias type>,<alias name>,<alias value>
R:<route type>,<route source>,<route target>
```

APPARATUS AND METHOD FOR NETWORK ANALYSIS

BACKGROUND

This application claims the benefit of U.S. Provisional Application Ser. No. 60/286,966, filed Apr. 30, 2001.

GOVERNMENT RIGHTS

The invention was made with Government support under a classified contract awarded by the U.S. Government. The Government may have certain rights in the invention.

FIELD OF THE INVENTION

The present invention generally relates to the field of network analysis. More particularly, the present invention relates to methods and apparatus for parsing information in network protocols into a common language for analysis.

BACKGROUND OF THE INVENTION

Not long ago, people communicated important information between one another through the physical delivery of paper. Delivering documents in this way to convey important information once dominated business but has since been largely displaced by electronic delivery and communication. Whether it is by email or otherwise, today people send many sensitive and important documents and information electronically.

The movement to electronic distribution of information has increased businesses' awareness of security issues. Electronic files are easy to copy and transmit out of an unwitting organization. Potential saboteurs like hackers, for example, can access, steal, alter, and/or destroy important information.

This increased awareness in security issues concerning electronic communications led companies to begin to monitor data transfers between entities, such as people, computers, and resources. The enormous volume of data generated by communications between entities (e.g., people viewing websites, people sending emails to one another, people transferring files to one another, and many other communications) made it difficult for a company to monitor all of the communication information. To help alleviate this problem, companies developed systems that analyze communications to determine which communications are likely illegal or otherwise prohibited by the companies' business rules.

Computers on a network send information to each other as part of a communication session. The data for this communication session is broken up by the network and transferred from a source address to a destination address. This is analogous to the mail postal system, which uses zip codes, addresses, and known routes of travel to ship packages. If one were to ship the entire contents of a home to another location, it would not be cost effective or an efficient use of resources to package everything into one container for shipping. Instead, smaller containers would be used for the transportation and assembled after delivery. Computer networks work in a similar fashion by taking data and packaging it into smaller pieces for transmitting across a network. Each of these packets is governed by a set of rules that defines its structure and the service it provides. For example, the World Wide Web has a standard protocol defined for it, the Hyper Text Transport Protocol (HTTP). This standard protocol dictates how packets are constructed and how data is presented to web servers and how these web servers return data to the client web browsers.

Any application that transmits data over a computer network uses one or more protocols. There are many layers of protocols in use between computers on a network. Not only do web browsers have protocols they use to communicate, but the network has underlying protocols as well. This technique is called data encapsulation. For example, when you make a request to a web site, your data request is encapsulated by the HTTP protocol used by your browser. The data is then encapsulated by the computer's network stack before it is put onto the network. The network may encapsulate the packet into another packet using another protocol for transmission to another network. Each layer of the protocol helps provide routing information to get the packets to their target destination.

In order for a company to analyze or monitor its users' traffic effectively, companies typically use tool(s) to: "sniff" or capture the packets traversing the network of interest; understand the protocol being used in the communication; analyze the data packets used in the communication; and draw conclusions based on information gained from this analysis. Conventional tools for analyzing network traffic include protocol analyzers, intrusion detection systems, application monitors, log consolidators, and combinations of these tools.

A conventional protocol analyzer can provide insight into the type of protocols being used on a network. The analysis tools within this analyzer enable the analyzer to decode protocols and examine individual packets. By examining individual packets, conventional protocol analyzers can determine where the packet came from, where it is going, and the data that it is carrying. It would be impossible to look at every packet on a network by hand to see if security concerns exist, therefore, more specialized analysis products were created.

One example of a more specialized but conventional analysis tool is an Intrusion Detection System (IDS), which validates network packets based on a series of known signatures. If the IDS determines that certain packets are invalid or suspicious, the IDS will alert the company. Company employees, in some cases using additional analysis tools, must then analyze most of these alerts. This analysis can require extensive manpower and resources.

Another example of a more specialized but conventional analysis tool is an application monitor. Application monitors focus on specific application layer protocols to decide if illegal or suspicious activity is being performed. This conventional application monitor may focus, for example, on the Hyper Text Transfer Protocol (HTTP) to monitor employee accesses to websites. When this monitor is used, such as when an employee visits a website, the company can monitor the packets transmitted and received between the employee's computer and the web server. These packets can be analyzed by parsing the HTTP protocol to determine the website's hostname, the name of the file requested, and the associated content that was retrieved. Thus, this HTTP analyzer could be used to decide if an employee is visiting inappropriate web sites and alert the company of this activity. This type of analysis tool monitors the actions of web browsers, but falls short for other types of communications.

Another conventional application monitor can monitor the Simple Mail Transport Protocol (SMTP). This system could be used record and track e-mails sent outside of the company to ensure employees were not sending trade secrets or intellectual property owned by the company. It could also ensure e-mails entering into the corporation did not contain malicious attachments or viruses. Employees could, however, use other means of communication such as instant messaging, chat rooms, and website-based e-mail systems. Because this application monitor only monitors SMTP communications, companies must also use many other security and analytical tools to monitor network activity.

Another example of a more specialized but conventional analysis tool is a log consolidator system (LCS). The LCS processes log-based output from network applications or devices. These data inputs can include firewall logs, router logs, application logs such as web server or mail server logs, computer system logs, and/or IDS alerts. Typically, a specific LCS analysis tool is required for each different log format, which means multiple analysis systems are needed for each different type of log file format.

While these and other conventional network analysis systems analyze communications of a particular protocol or format, they fail to analyze a broad breadth of protocols and formats. Thus, a company wishing to ensure security of its network currently must purchase and maintain multiple network analysis systems. Further, with each new protocol or protocol change, companies must create, rewrite, upgrade, or repurchase at least one of their systems. The conventional method of using a patch-work of multiple analyzers is expensive and complex to maintain.

In addition, because of the many ways to communicate over a network and the many different analysis tools needed to perform network forensics, the conventional method makes it difficult to answer even simple questions such as "What is happening on my network?," "Who is talking to whom?," and "What resources are being accessed?" It is difficult because there is no limit as to which applications one can use. Each application introduced onto a network brings new protocols and new analytical tools to audit those applications. For example, there are many ways to send a file to another person using a network: E-mailing the document as an attachment using the SMTP protocol; transmitting the file using an Instant Messenger like MSN, AOL IM™, or Yahoo™ IM; uploading the file to a shared file server using the FTP protocol; web sharing the document using the HTTP protocol; or uploading the file directly using an intranet protocol like SMB or CIFS. All of these protocols are implemented differently and special analysis tools are required to interpret them; a complex and expensive system.

The conventional analysis systems also fail because they require training personnel to use the numerous analysis tools needed to investigate network communications having many different protocols. This training is expensive. In addition, network analysis continues to become increasingly difficult due to the large number of new applications and protocols being introduced every year.

Other systems found outside of computer networks have similar issues regarding analysis. These issues can be found in "badge swipe" systems, used to monitor the movement of persons in and out of a building, in traffic monitoring systems that monitor cars passing through radio frequency identification (RFID) toll points, property monitoring systems that monitor video cameras and various motion sensors or other sensors, and in other contexts involving the collection and analysis of data of varying protocols or languages. Specific analytical tools must be developed for each collection system making it difficult to cross-correlate events and perform analysis.

SUMMARY OF THE INVENTION

To address the foregoing problems and others associated with monitoring large volumes of data in numerous protocols, the present invention is directed to conversion of network traffic containing multiple protocols into a common language suited for analysis. In addition, because data in multiple, disparate protocols may be described in a common language, a unique analysis logic or a protocol-specific analyzer will not be needed for every protocol, thereby significantly reducing the complexity associated with conventional systems.

In one aspect of the invention, the common language of the present invention permits any network transaction, regardless of the particular application or protocol, to be described.

In another aspect of the invention, common language descriptions are stored as "metadata," which describes the communication. As used herein, the term "metadata" means information taken from a communication or associated with a communication that describes the communication. For example, metadata can include the communication's start time; stop time; size; protocols used; computers, entities, and resources involved; routing information; aliases of the computers, entities, and resources; properties of communication; and other information useful to a person or computer analyzing the communication. Common language descriptions of the metadata describing a communication often requires less than one percent of the storage space as the communication itself.

In another aspect of the invention, the common language is in the form of an event-based language that permits description of a communication in terms of its sessions, events, and properties.

In another aspect of the invention, protocol-specific data is parsed into an event-based language based on the nature of the transaction included within the data.

The present invention can be used in a variety of contexts, including transactions in a computer network, transactions in an application or device log file, transactions found on computer media, transactions in badge detectors, transactions generated by motion detectors, transactions generated in connection with phone calls, transactions generated in connection with credit card transactions, and other systems in which transactions occur according to one or more protocols. Generally, systems with communications using multiple protocols, formats, and/or application types can benefit from the invention.

Additional features and advantages of the present invention will be set forth in the description which follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

FIG. 9a illustrates an exemplary generation and form of an event-based language in accordance with the present invention.

FIG. 9b illustrates an exemplary generation and form of an event-based language in accordance with the present invention.

FIGS. 9c and 9d illustrate two exemplary generations of an event-based language in accordance with the present invention.

FIG. 10 illustrates an exemplary data conformed to an HTTP protocol in accordance with the present invention.

FIG. 11a illustrates an exemplary data conformed to an SMTP protocol in accordance with the present invention.

FIG. 11b illustrates an exemplary data conformed to an FTP protocol in accordance with the present invention.

FIG. 12a illustrates an exemplary generation of an event-based language in accordance with the present invention.

FIG. 12b illustrates an exemplary form of an event-based language in accordance with the present invention.

DETAILED DESCRIPTION OF THE INVENTION

Figure 1:
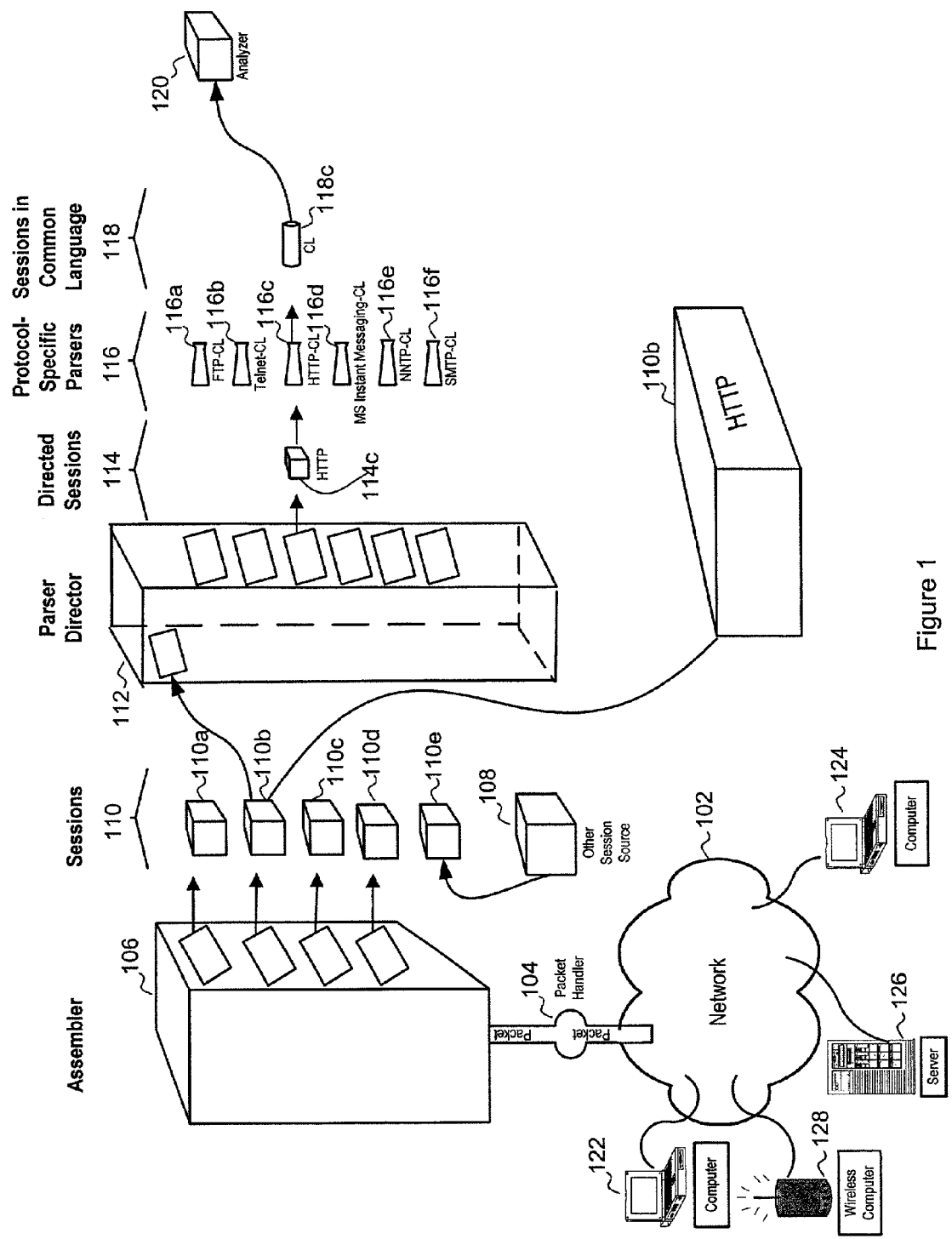
FIG. 1 is a schematic diagram of a system for analyzing computer network traffic in accordance with an embodiment of the invention.

FIG. 1 is a schematic diagram of a system for analyzing network traffic in accordance with an embodiment of the present invention. Generally, the embodiment of the present invention shown in FIG. 1 is a system configured to translate network communications or input files containing network communications into a common language for analysis. Specifically, this embodiment includes a system configured to input packets associated with communications across a network, assemble those packets into sessions, direct the sessions to appropriate parsers, parse the sessions into session in a common language, and communicate these common-language sessions to an analyzer.

For example, a protocol-specific parser in accordance with the present invention can convert protocol-specific data at any network level into a common language. The common language can be used to describe network layer communications including, for example: Ethernet, Token Ring, TCP/IP, IPX/SPX, AppleTalk™, IPv6, and other network layer protocols. The common language also can be used to describe application layer communications including, for example: SMTP, HTTP, TELNET, FTP, POP3, RIP, RPC, Lotus Notes™, TDS, TNS, IRC, DNS, SMB, RIP, NFS, DHCP, NNTP, instant messengers (AOL IM™, MSN, YAHOO™) and other application layer protocols. The common language can also be used to describe the content of communications including, for example: E-Mail messages, PGP, S/MIME, V-Card, HTML, images, and other content types.

In FIG. 1, a network 102 represents any network whereby communication between two or more entities may be made or monitored. Network 102 may be a simple network, for example, a cable connecting two computers, such as a computer 122 and a computer 124. Network 102 may be a complex network as well, such as representing a network configured to pass, allow passage of, or monitoring of communications between computers, servers, wireless computers, satellites, or other communication devices. For example, network 102 may represent intranets, extranets, and global networks including the Internet. For clarity in explaining but not to limit the function of network 102, FIG. 1 sets forth a limited number of communication devices communicating through or monitored by network 102: computer 122; computer 124; a server 126; and a wireless computer 128.

Typically, communications between entities across or monitored by network 102 are made in pieces, rather than as a complete transfer. In such cases, a complete communication between two entities is broken into multiple pieces, or "packets," of data. Such packets conform to one or more protocols. As used herein, the terms "protocol or protocols," depending on the context, refers to network protocols such as TCP/IP, IPX/SPX, or AppleTalk™, as well as application protocols, such as FTP, SMTP, HTTP, and so forth. In other words, the terms "protocol or protocols," unless the context establishes a particular protocol, is intended to include any protocol in which data may be represented or transferred in any communication system.

A packet handler 104 is configured to monitor the many packets of data in network 102. For example, packet handler 104 can be a sniffer, such as EtherPeek™ available from WildPackets, Inc. In doing so, packet handler 104 is also configured to copy the packets in network 102. Packet handler 104 is also configured to send the packets to an assembler 106. Alternatively, assembler 106 may be configured to access the copied packets from packet handler 104. Packet handler 104 may also be configured to send the packets in real-time to an assembler 106 without recording the packets. In any event, assembler 106 is configured to receive the packets of data representing communications in network 102. Packet handlers and assemblers may, in a preferred embodiment of the invention, be configured as set forth in copending U.S. patent application Ser. No. 09/552,878, filed Apr. 20, 2000, claiming the benefit of U.S. Provisional Application No. 60/131,904, filed Apr. 30, 1999, which is incorporated herein by reference in its entirety.

Assembler 106 is also configured to assemble the packets into the communication that the packets represent. Such communications are preferably assembled into sessions. Each session represents a communication between two or more entities. In an exemplary embodiment of the present invention, assembler 106 is configured to assemble the packets into a set of sessions 110. For example, the set of sessions 110 can include sessions 110a, 110b, 110c, and 110d. Sessions 110a, 110b, 110c, and 110d can conform to the same protocol, or conform to different protocols. For example, one of the sessions, session 110b conforms to the well-known HTTP application protocol.

Sessions can also be generated by other session sources 108. Other session sources 108 can generate sessions that conform to a specific application type or protocol. These sources typically do not require the assembler 106 to reconstruct the network packets into a session. As shown in FIG. 1, for example, other session sources 108 generates a session 110e. Session 110e conforms to a protocol, which may be, but need not be, the same as the protocol associated with one of the sessions of set of sessions 110.

Sessions generated by assembler 106 or other session source, such as other session source 108, are transmitted (or input) to a parser director 112. Parser director 112 is configured to accept sessions generated by assembler 106 or other session source 108. Parser director 112 directs each session to one of a set of protocol-specific parsers 116 corresponding to the protocol of the session. Each protocol-specific parser in the set of protocol-specific parsers 116 is configured to receive sessions corresponding to that particular protocol. For example, protocol-specific parser 116a is configured to receive sessions conforming to the File Transfer Protocol (FTP). Protocol-specific parser 116b is configured to receive sessions conforming to the Telnet protocol. Protocol-specific parser 116c is configured to receive sessions conforming to the HTTP protocol. Protocol-specific parser 116d is configured to receive sessions conforming to MS instance messaging protocol. Protocol-specific parser 116e is configured to receive sessions conforming to the Network News Transfer Protocol (NNTP). Protocol-specific parser 116f is configured to receive sessions conforming to the Simple Mail Transfer Protocol (SMTP). For example, directed session 114c (related to session 110b) is directed to protocol-specific parser 116c because protocol-specific parser 116c is configured as an HTTP parser. As described in detail below, each protocol-specific parser is configured to produce a common language representation of each session that is input to it.

An analyzer 120 communicates with the output of any of the set of protocol-specific parsers 116. That is, analyzer 120 is configured to communicate with protocol-specific parsers 116 using the common language generated by each of the set of protocol-specific parsers 116. Thus, analyzer 120 can communicate with any of the protocol-specific parsers 116 regardless of the protocol of the sessions they are configured to handle. Consequently, using the common language output of protocol-specific parsers 116 eliminates the need to have a plurality of parsers corresponding to each of the protocols as required in conventional network analysis systems.

Figure 2:
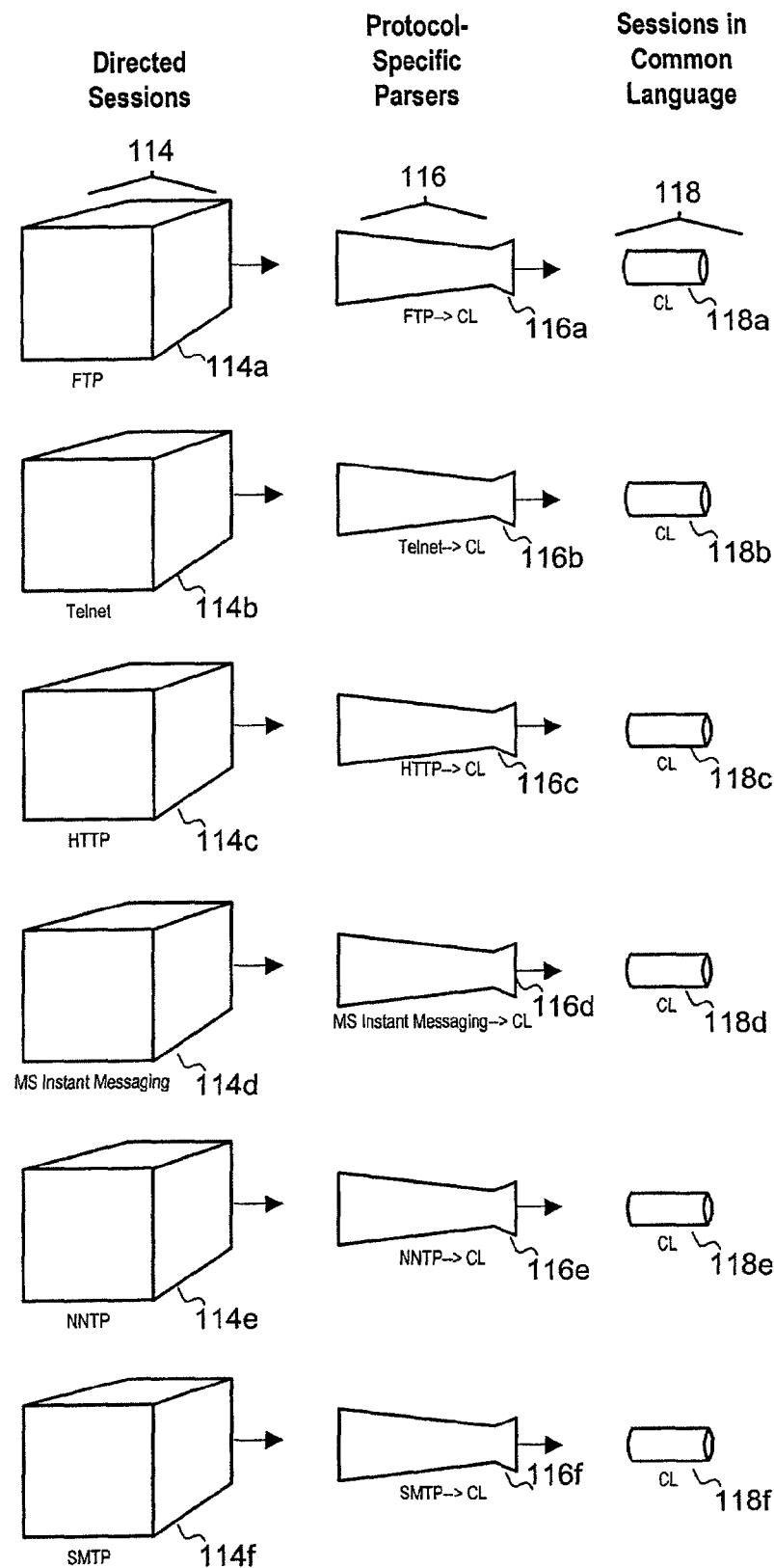
FIG. 2 is a schematic diagram of parsers in accordance with an embodiment of the invention.

FIG. 2 is a schematic diagram illustrating the parser aspect of the present invention in greater detail. Directed sessions 114 are the sessions output by parser director 112 according to the protocol(s) of the sessions. Directed sessions 114 are directed to a set of protocol-specific parsers 116.

As shown in FIG. 2, directed sessions 114 generally conform to disparate protocols. For example, in the embodiment illustrated in FIG. 2, six sessions having different protocols are shown. The six protocols are FTP, Telnet, HTTP, MS Instant Messaging, NNTP, and SMTP. It would be apparent to those skilled in the art that the illustrated protocols are by way of example only. Any set of protocols could be represented. Each directed session output by parser director 112 is input to a protocol-specific parser configured to process the protocol associated with that session. For example, as illustrated in FIG. 2, FTP session 114a is input to an FTP-specific parser 116a. Telnet session 114b is input to Telnet-specific parser 116b. HTTP session 114c is input to HTTP-specific parser 116c. MS Instant Messaging session 114d is input to MS Instant Messaging-specific parser 116d. NNTP session 114e is input to NNTP-specific parser 116e. SMTP session 114f is input to SMTP-specific parser 116f.

Protocol-specific parsers 116 process their input in order to output data conformed to a protocol-independent common language. As used herein, the term "common language" means a language that can be used to represent network traffic conformed from multiple, disparate protocols. The content expressed in the form of the common language may be referred to herein as "metadata." In an exemplary embodiment, the common language is an event-based language (described in greater detail below). For example, FTP-specific parser 116a outputs sessions in a common language 118a. Telnet-specific parser 116b outputs session in a common language 118b. HTTP-specific parser 116c outputs session in a common language 118c. MS Instant Messaging-specific parser 116d outputs session in a common language 118d. NNTP-specific parser 116e outputs session in a common language 118e. SMTP-specific parser 116f outputs session in a common language 118f.

Figure 3:
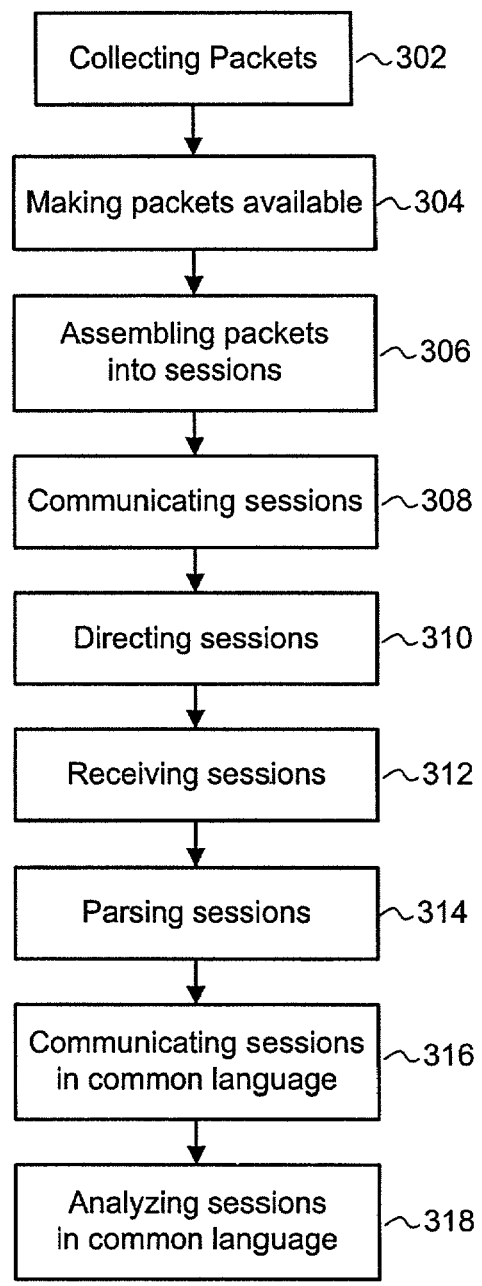
FIG. 3 is a flow diagram of a method for analyzing data packets in accordance with an embodiment of the present invention.

FIG. 3 is a flow diagram of an embodiment of a method for analyzing network traffic in accordance with the present invention. Generally, this method is practiced by a system that collects, assembles, and parses data conformed to multiple protocols into data conformed to a common language. As would be known to those skilled in the art, many different elements, configurations, or combination of elements can be used to implement the methods described below. For clarity, however, the below description of preferred methods of the invention uses many of the elements described in FIGS. 1 and 2.

In step 302, packet handler 104 collects packets from network 102. Preferably, as part of collecting packets in step 302, packet handler 104 monitors communications comprising packets across network 102. In one embodiment of the present invention, packet handler 104 collects packets by copying them from the monitored communications across network 102. The collected packets can be stored in a file (not shown).

In step 304, packet handler 104 makes the collected packets available to assembler 106. Packet handler 104 can make the packets available to assembler 106 by storing the packets in a file that assembler 106 can access. In another exemplary embodiment, packet handler 104 makes the packets available to assembler 106 in real-time without recording the packets. In each of these embodiments, as part of step 304, assembler 106 receives the collected packets.

In step 306, assembler 106 assembles the packets into sessions. These sessions preferably consist of packets of the same network protocol and preferably the same source/target addresses found in each network layer. In step 308, assembler 106 communicates the sessions, which conform to one or more protocols to parser director 112. Alternatively, parser director 112 may actively capture sessions 110 from assembler 106.

In step 310, parser director 112 directs assembled sessions to protocol-specific parsers 116. In an exemplary embodiment, parser director 112 performs protocol matching and lexical analysis of the session content to decide to which protocol-specific parsers 116 to direct each assembled session.

In step 312, protocol-specific parsers 116 receive directed sessions 114 from parser director 112. In step 314, protocol-specific parsers 116 output the parsed sessions in the common language. As described above, each of protocol-specific parsers 116 operates on sessions that conform to the protocol to which the parser is configured to parse. If there is more than one protocol present in the session data presented to parser director 112, preferably there will be a protocol-specific parser for each protocol present in the session data. The protocol-specific parsers output a common language representation of the session data input to them. Preferably, the protocol-specific parsers parse metadata representative of the session data. Also preferably, the metadata conforms to the common language.

In step 316, protocol-specific parsers 116 submit the common language data to an analyzer. Protocol-specific parsers 116 can also record common language data to a record (or log). Also as part of step 316, protocol-specific parsers 116 or analyzer 120 may access the common language data from the record. If protocol-specific parsers 116 access the common language data from the record, protocol-specific parsers 116 then communicate the common language data to analyzer 120.

In step 318, analyzer 120 analyzes data conformed to the common language. Preferably, only one analyzer 120 is used to analyze all of the common language data. In an exemplary embodiment, only one analyzer using one analysis logic is needed to analyze the communications represented by the sessions because the communications are conformed to the common language rather than disparate protocols. In an exemplary embodiment, analyzer 120 is a workstation-based system having a graphical user interface (GUI) for formulating queries and performing other analyses on the database. In another exemplary embodiment, analysis tools, such as those included in analyzer 120, do not have to be changed when protocols are added or changed because protocol-specific parsers 116 can be modified or added to the system. Sessions parsed into metadata in the common language are described in an exemplary embodiment as common language data in FIGS. 1 and 2 and as common-language sessions or sessions in common language herein.

Figure 4:
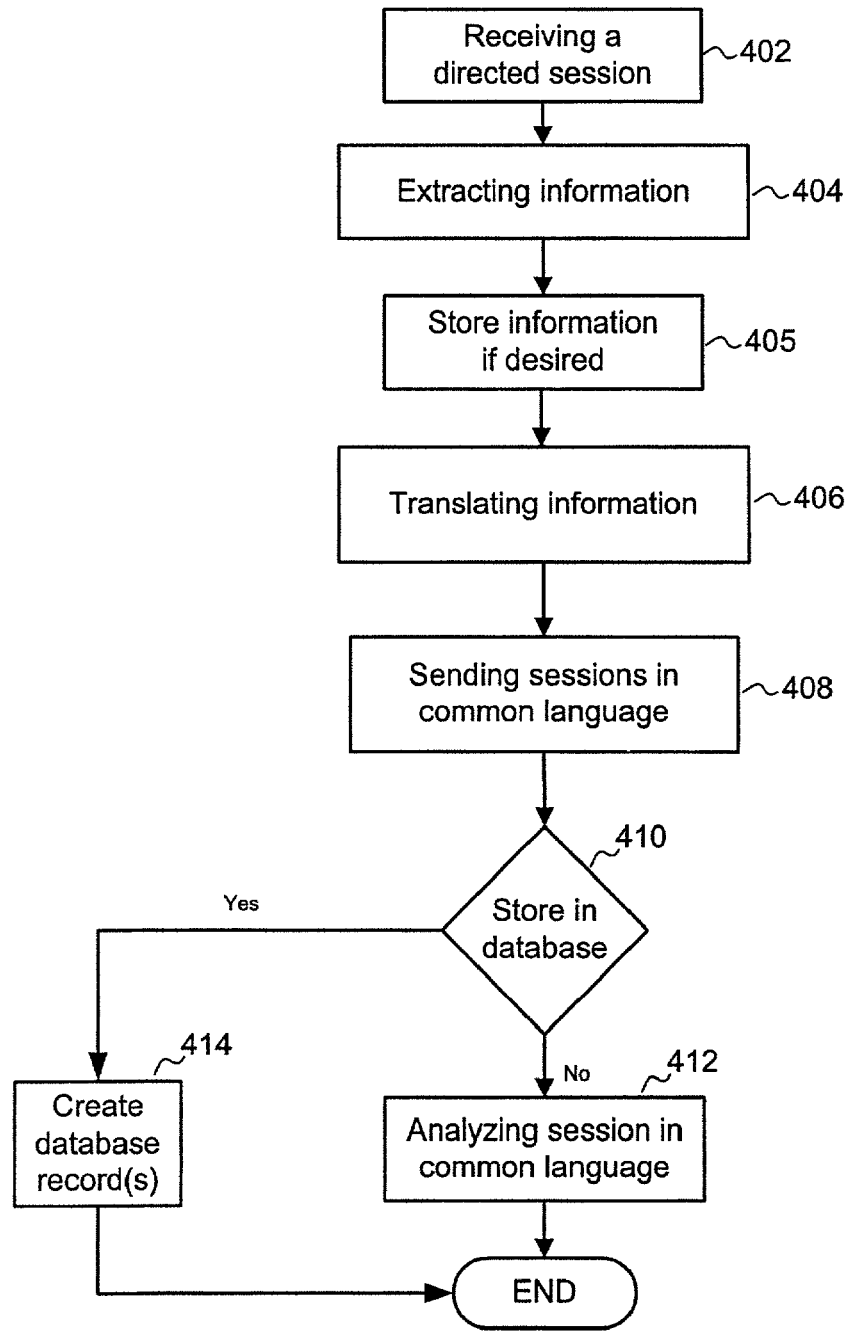
FIG. 4 is a flow diagram of a method for analyzing session data in accordance with an embodiment of the present invention.

FIG. 4 is a flow diagram of another embodiment of a method for analyzing network communications in accordance with the present invention. Generally, the method comprises steps for parsing information from sessions conforming to one or more protocols into metadata conforming to a common language. Many different elements, configurations, or combinations of elements can be used to implement the methods described below. For clarity, however, the below description of preferred methods of the invention uses many of the elements set forth in FIGS. 1 and 2.

In step 402, protocol-specific parsers 116 receive directed sessions 114. Each parser of protocol-specific parsers 116 receives only directed sessions 114 that conform, at least in part, with the protocol to which the receiving protocol-specific parser is configured to parse. For example, parser 116b is configured to parse sessions conformed to the Telnet protocol. Thus, parser 116b receives any session that, in part, conforms with the Telnet protocol (see FIG. 2).

In step 404, protocol-specific parsers 116 extract information from directed sessions 114. If desired, the extracted information can be stored in step 405. In step 406, protocol-specific parsers 116 translate the extracted information into a common language. For example, Telnet-specific parser 116b extracts session data conforming to the Telnet protocol and translates that data into the common language.

Preferably, in step 404, protocol-specific parsers 116 carefully extract only information generally useful in analyzing the communication(s) that each session represents. By extracting only a portion of the information, this embodiment of the present invention creates a common language 118 representation of the session data that is significantly smaller than directed sessions 114 or sessions 110. Consequently, these representations are cheaper and more efficient to store. Moreover, the common language data is more quickly and easily analyzed due to its significantly smaller size.

In step 408, protocol-specific parsers 116 communicate sessions in common language 118. If the common language data is not to be stored in a database, as determined in step 410, protocol-specific parsers 116 may communicate each session of the sessions in common language 118 one-at-a-time or in groups to analyzer 120. In step 412, analyzer 120 analyzes sessions in common language 118. In this exemplary embodiment, only one analyzer 120 is used to analyze all of the sessions in common language 118. Alternatively, if the common language data is to be stored in a database, one or more database records for storing the common language data is created in step 414. The database can be later accessed by an analyzer such as analyzer 120 to analyze the data.

Figure 5:
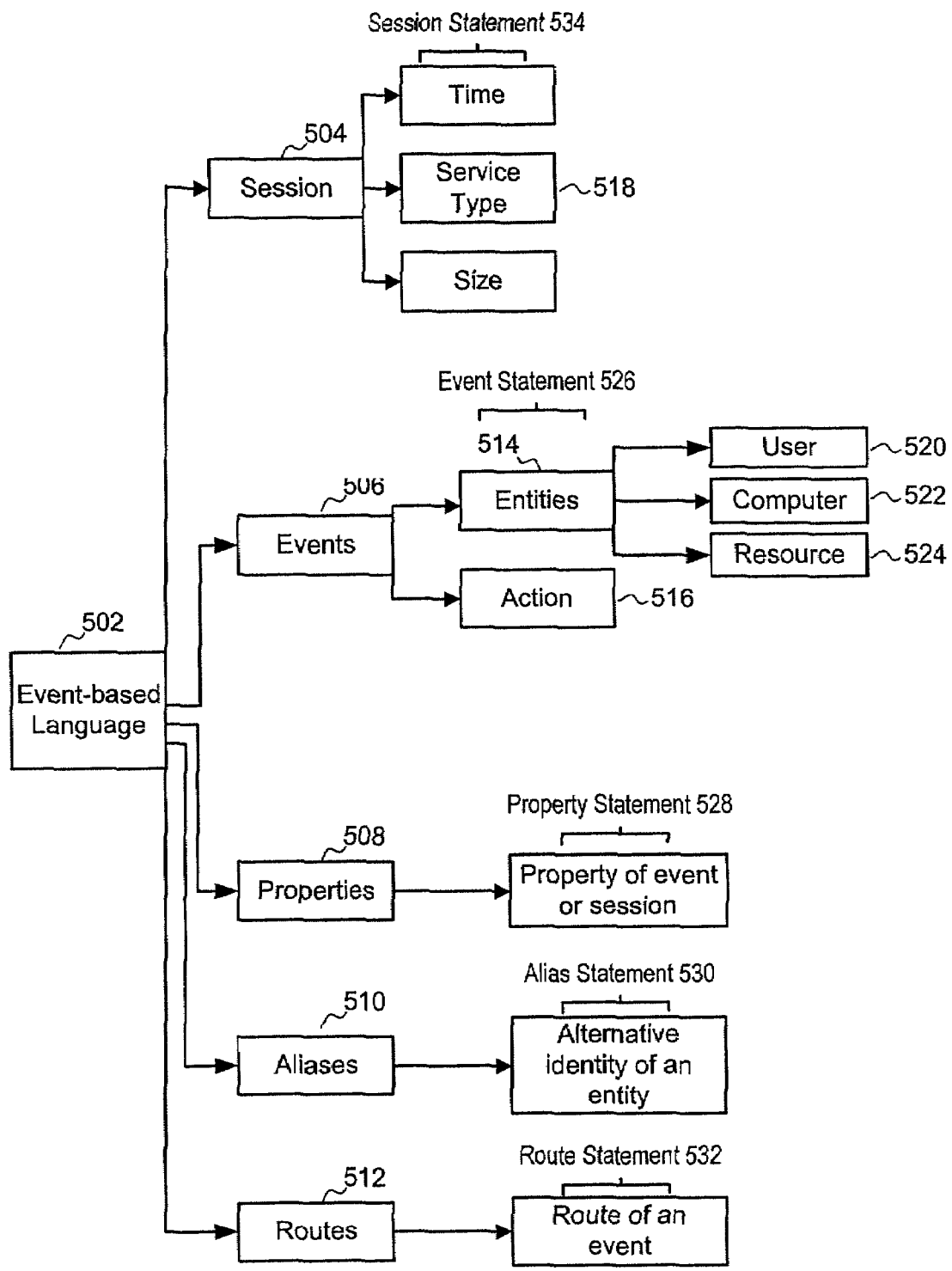
FIG. 5 is a schematic diagram of an event-based language in accordance with an embodiment of the present invention.

FIG. 5 is a schematic diagram of another embodiment of a system for analyzing network traffic in accordance with the present invention. Generally, this embodiment shows an exemplary embodiment of a common language, called an event-based language, to which network communications or input files containing communications are translated in preparation for analysis.

Preferably, event-based language 502 follows a taxonomy of session 504, events 506, and properties 508. In an exemplary embodiment, event-based language 502 further comprises aliases 510 and routes 512. According to the sessions-events-properties taxonomy, each session corresponds to one or more network events. In one embodiment, sessions may be used to group events per computer per application. For example, a computer in communication with a server using a Netscape browser can be one session; the server response to the computer can be another session. Sessions can be used to group events in other fashions, for example, in order to accommodate so-called "port-jumping" protocols. In another embodiment, sessions can encompass other sessions in a directory-type system structure.

Events 506 can be described in terms of entities 514 involved in each event of events 506. Generally, each event of events 506 corresponds to a communication between at least two entities 514. Each event of events 506 can also be described in terms of various properties 508 associated it. In an exemplary embodiment, each event of events 506 can also be described in terms of aliases 510 of entities 514 for each event, and routes 512 associated with each event. In an exemplary embodiment, aliases 510 of entities 512 can be recorded as a property to each entity (not shown in FIG. 5) and routes 512 can be recorded as indirect events to session 504.

In an exemplary embodiment, each session (e.g., network transaction or other communication) can be converted to a standard set of outputs. For example, there may be two basic outputs provided by a protocol-specific parser, such as one of protocol-specific parsers 116: events 506 and properties 508. Thus, the metadata describing sessions involving a variety of protocols can be stored in as little as two basic tables. This is a significant benefit of the present invention in comparison to prior approaches. For this exemplary embodiment, the metadata conforming to the event-based language can be stored in a log or record having as little as two columns.

FIG. 5 illustrates an exemplary structure of the event-based language as applied to transactions in a computer network. Preferably, each transaction will be grouped in a single session 504 and can be described in terms of one or more of: events 506, properties 508, aliases 510, and routes 512. In the embodiment set forth in FIG. 5, an entity of entities 514 can be one of three types: a computer 522, a user 520, or a resource 524. For example, an entity that is computer 522 could be a host, a server, a desktop, a laptop, and so forth. Computer 522 could be identified by a network address, a computer name, a host name, a port number, and so forth. Computer 522 can be a computer that is within network 102 (FIG. 1) or another network that is being accessed or one that is outside of either network 102 or the other network.

User 520 can be an individual, such as an authorized user on a computer network. User 520 may be an e-mail address, a local area network (LAN) user, the "Full Name" (real name) of the user, a handle or name used to identify user 520, and so forth.

Resource 524 may be a resource that is accessed or used during an event. For example, resource 524 may be a file, data from within a database, or a message from a shared bulletin board. Resource 524 can also be a container of other resources, such as a file system directory structure, a database, tables in a database, or a shared bulletin board. Examples of entity types, such as resource 524, computer 522, and user 520, and corresponding numerical representations are:

100, "IP";
101, "IP-PORT";
102, "IP-USER";

103, "IP-RESOURCE";
200, "HOST";
201, "HOST-PORT";
202, "HOST-USER";
203, "HOST-RESOURCE"; and
300, "GROUP."

In the exemplary embodiment set forth in FIG. 5, the common language is represented by an event-based language. The event-based language permits events on a computer network to be described using so-called event statements. For example, an event can refer to transactions between or involving differing types of entities, such as the following interactions between entities: computer→computer; user→computer, user→user, users→resource, and so forth.

An event statement 526 describes an action taken by one entity with respect to at least one other entity using a service. Thus, each event statement 526 preferably comprises two parameters: (1) one or more entities 514; and (2) an action 516.

A session statement 534 describes a session. As such, each session statement 534 includes some facts about session 504. In an exemplary embodiment, session statement 534 includes the times that session 504 began/ended, the size of session 504 (e.g., 1.5 MB), and a service type 518 of the session. Generally, service types (sometimes referred to herein as "services" or "applications") refers to or is related to a protocol or application used during network communications. A property statement 528 preferably includes facts about either session 504 or event 506. In an exemplary embodiment where event 506 includes an email communication, property statement 528 can include the subject line of the email communication. A route statement 532 preferably includes facts about the route that an event traveled. An alias statement 530 preferably includes information regarding the identity of user 520, computer 522, or resource 524.

Examples of actions that might be logged into a record using the event-based language for network level communications include: an ETHERNET transaction, an IP transaction, or a TCP transaction. Examples of actions that might be logged into a record at the application level: a "user login" (a user attempting or obtaining access to a system) a "user logoff," a "get resource" (e.g., getting or acquiring a resource, such as downloading a file or selecting a database row), a "put resource" (e.g., performing an operation using a resource, such as saving a file, uploading a file, or inserting a database row), a "delete resource" (e.g., removing a resource, such as deleting a file or database row), a "send message" (e.g., sending an e-mail or sending an Instant Message), a "receive message" (e.g., receiving an e-mail or receiving an Instant Message), a "read message" (e.g., opening an e-mail or opening an Instant Message to read it), a "database query request" (e.g., a client issuing a request from a database), and a "database query response" (e.g., a server providing a response to the client's request). Examples of actions that can be logged into a record in an exemplary system and corresponding numerical representations are:

1, "IP Transaction";
10, "User Login";
11, "User Logoff";
20, "Get Resource";
21, "Put Resource";
22, "Delete Resource";
30, "Send MSG";
31, "Receive MSG";
32, "Read MSG";
33, "Delete MSG";
40, "Database Query";
110, "User Login Response";
111, "User Logoff Response";
120, "Get Resource Response";
121, "Put Resource Response";
122, "Delete Resource Response";
130, "Send MSG Response";
131, "Receive MSG Response";
132, "Read MSG Response"; and
140, "Database Query Response."

Other values for actions can be used in order to tailor the common language to a particular computer network or to accommodate new applications. Generally, the library of actions is sufficient to describe actions, such as action 516, taken in connection with a communication between two entities, such as entities 514.

Examples of services that might be logged into a record using the common language include: File Transfer Protocol (FTP), TELNET, Simple Mail Transfer Protocol (SMTP), Domain Name Service (DNS), Hypertext Transfer Protocol (HTTP), POP3, Network News Transfer Protocol (NNTP), Server Message Block (SMB), MSSQL™/Sybase™ Database protocol (e.g., TDS), Oracle™ Database Protocol (e.g., TNS), Lotus Notes™, Dynamic Host Configuration Protocol (DHCP), Remote Procedure Call (RPC), Routing Information Protocol (RIP), Network File System (NFS), and Instant Messenger Protocols (AOL™, MSN, Yahoo™, etc.). Examples of services that can be logged into a record in an exemplary system and corresponding numerical representations are:

21, "Ftp";
23, "Telnet";
25, "E-Mail (SMTP);
53, "Domain Name Service";
67, "DHCP";
5190, "AOL™ Instant Msg";
5050, "Yahoo™ Instant Msg";
80, "WWW";
109, "E-Mail (POP-2)";
110, "E-Mail (POP-3)";
119, "News";
135, "Microsoft RPC";
137, "Netbios™";
139, "MS File Access";
161, "SNMP";
520, "RIP";
1122, "MS Instant Msg";
1352, "Lotus Notes™";
1362, "Sybase™ Database";
1433, "MSSQL™ Database";
1521, "Oracle™ Database";
1533, "Lotus Sametime™";
2049, "Unix™ File Access"; and
6667, "IRC."

Other values for services can be used in order to tailor the event-based language to accommodate new applications and protocols.

Using the two parameters (entities 514 and action 516), event statement 526 can be expressed in the form: <ENTITY1> was seen <ACTION> to <ENTITY2>. In an exemplary embodiment, event statement 526 can also include service type 518, as shown in FIG. 9a. As shown in FIG. 9a, the expression of event statement 526 is of the form: <ENTITY1> was seen <ACTION> to <ENTITY2> with <SERVICE TYPE> for an event of events 506 involving two entities of entities 514, one at the "source" end and one at the "target" end. For an event involving multiple entities of entities 514 at each end, event statement 526 can be expressed as:

<ENTITY1A, ENTITY1B> was seen <ACTION> to <ENTITY 2A, ENTITY2B> with <SERVICE TYPE>, also as shown in FIG. 9a.

For example, event 506 for a first user (TODD) of entities 514 sending an e-mail to a second user (DAMON) of entities 514 can be expressed by event statement 526 conformed to the following form: <USER TODD> was seen <SENDING MESSAGE> to <USER DAMON> with <SMTP>, as shown in FIG. 9a.

Also for example, event 506 for a user (TODD) of entities 514 using a first computer to receive via File Transfer Protocol (FTP) a file containing a password stored on a second computer can be expressed by event statement 526 conformed to the following form: <COMPUTER 192.168.1.2, USER TODD> was seen <GETTING RESOURCE> from <COMPUTER 192.168.1.1, RESOURCE: /etc/passwd> using <FTP>, as shown in FIG. 9a.

Protocol-specific parsers 116 (FIGS. 1 and 2) do not have to output events in the format of event statement 526. Preferably, however, protocol-specific parsers 116 extract and output three parameters that can form event statement 526: entities, action, and service type. These basic parameters can be stored and, if desired, displayed in event statement format for a readily comprehended metadata description of the event, or in some other format.

Each event 506 may also have properties associated with the event. For example, event 506 corresponding to an e-mail (e.g., referring to the action types listed above, the action type "SEND_MSG" and the service "E-mail (SMTP)") may have associated properties. For example, the properties for such an e-mail may include the subject line of the e-mail ("IMPORTANT INFORMATION, PLEASE READ"), the sender password ("test12"), and the application used for the action ("Outlook Express"). FIG. 9b illustrates an exemplary property name-value pair for storing properties associated with an event. FIG. 9b shows three name fields: "subject," "password," and "application." FIG. 9b shows three values for those name fields: "IMPORTANT INFORMATION, PLEASE READ", "test12", and "Outlook Express". Other property types or fields could be included, such as the size of the event, the time of the event, file attachments, full names of the sender and all recipients, and so forth.

Each event, such as event 506, may also have associated routes, such as route 512. Route 512 refers to network communication information that may be carried within captured data, but that was not directly observed in collecting the data. For example, a collected e-mail may include a list or log of the servers through which the e-mail message passed. This internal routing information, while not directly observed, can be extracted and stored. FIG. 9c illustrates an exemplary format for capturing the routing information. The exemplary format is a <COMPUTER ENTITY> to <COMPUTER ENTITY> format. Event 506 may have multiple routes 512 corresponding to multiple route statements, each like the one shown in FIG. 9c.

Each event, such as event 506, may also have associated aliases, such as alias 510. Aliases 510 are names or values for an entity (e.g., a computer or a user) that describe the same entity. For example, event 506 may involve a computer entity, such as computer 522, defined by the IP address "192.168.1.12." Event 506 may also involve a user entity, such as user 520, defined by the e-mail address "todd@forensicsexplorers.com." Computer 522 may be correlated to the alias "forensicsexplorer.com" and user 520 may be correlated to the alias "Todd Moore." FIG. 9d illustrates an exemplary storage format for storing alias information for events. Therefore, the present invention provides that when event 506 is extracted the observed entities 514 can be correlated to known aliases 510. This information can be stored and associated with event 506 for later review and/or processing.

To create event statements or otherwise generate metadata, the invention parses information from each session or other communication data. In an exemplary embodiment, using for purpose of clarity the elements of FIGS. 1 and 2, the invention parses information following the method set forth in FIG. 6.

Figure 6:
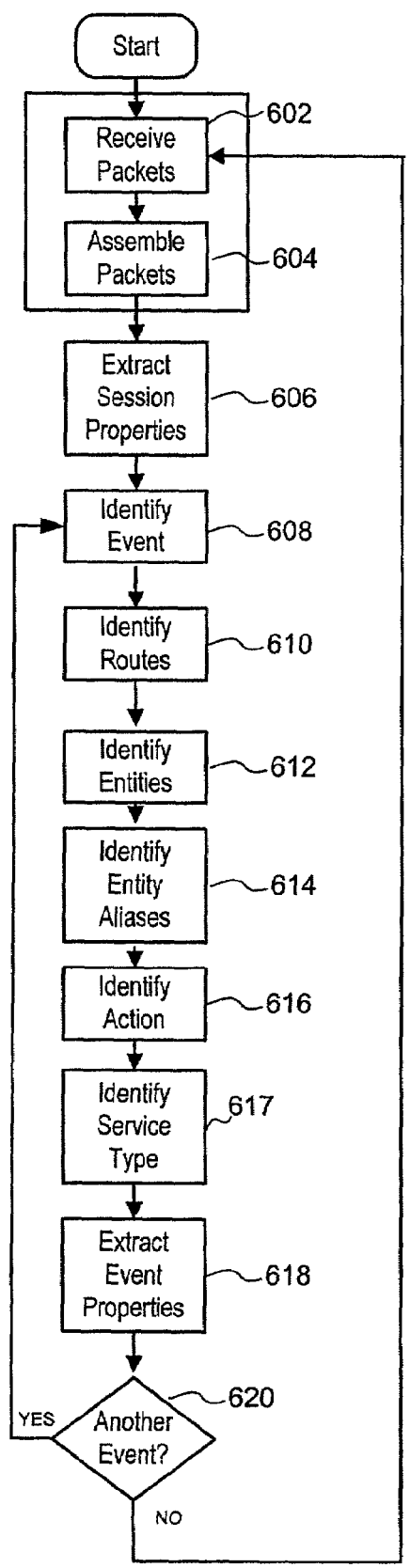
FIG. 6 is a flow diagram of a method for generating an event-based language from data packets in accordance with an embodiment of the present invention.

FIG. 6 provides a flow diagram for an exemplary method for converting sessions into the event-based language. As described above, the event-based language is one example of a common language according to the present invention. In an exemplary embodiment intending to reduce the number of tables in a metadata log, the step of identifying event routes may comprise treating an identified route as an "indirect event." In this embodiment, the step of identifying aliases may comprise treating an identified alias as a property of an entity. This might permit storing routes in an event table and aliases in the properties table. By treating routes and aliases under the rubric of events and properties, respectively, the number of tables required for a log or file of the sessions can be reduced.

In the exemplary embodiment set forth in FIG. 6, assembler 106 (FIG. 1) receives packets in step 602. The packets are assembled into sessions in step 604. Protocol-specific parsers 116 (in this case one parser for each protocol in the session), extract session properties in step 606. Protocol-specific parsers 116 then identify events in step 608, identify routes in step 610, identify entities in step 612, identify entity aliases in step 614, identify actions in step 616, and extract event properties in step 618, from within the session. Protocol-specific parsers 116 continue to parse the session until all events within the session have been parsed in step 620. Protocol-specific parsers 116 parse other sessions, according to step 620 and so forth.

The method illustrated in FIG. 6 presumes that the service type will be the same for all events in a session. Accordingly, the service is extracted as a property of the session. Alternatively, the service type can be identified for each event. In that case, the method performs the step of identifying a service type in the session in step 617.

Figure 7:
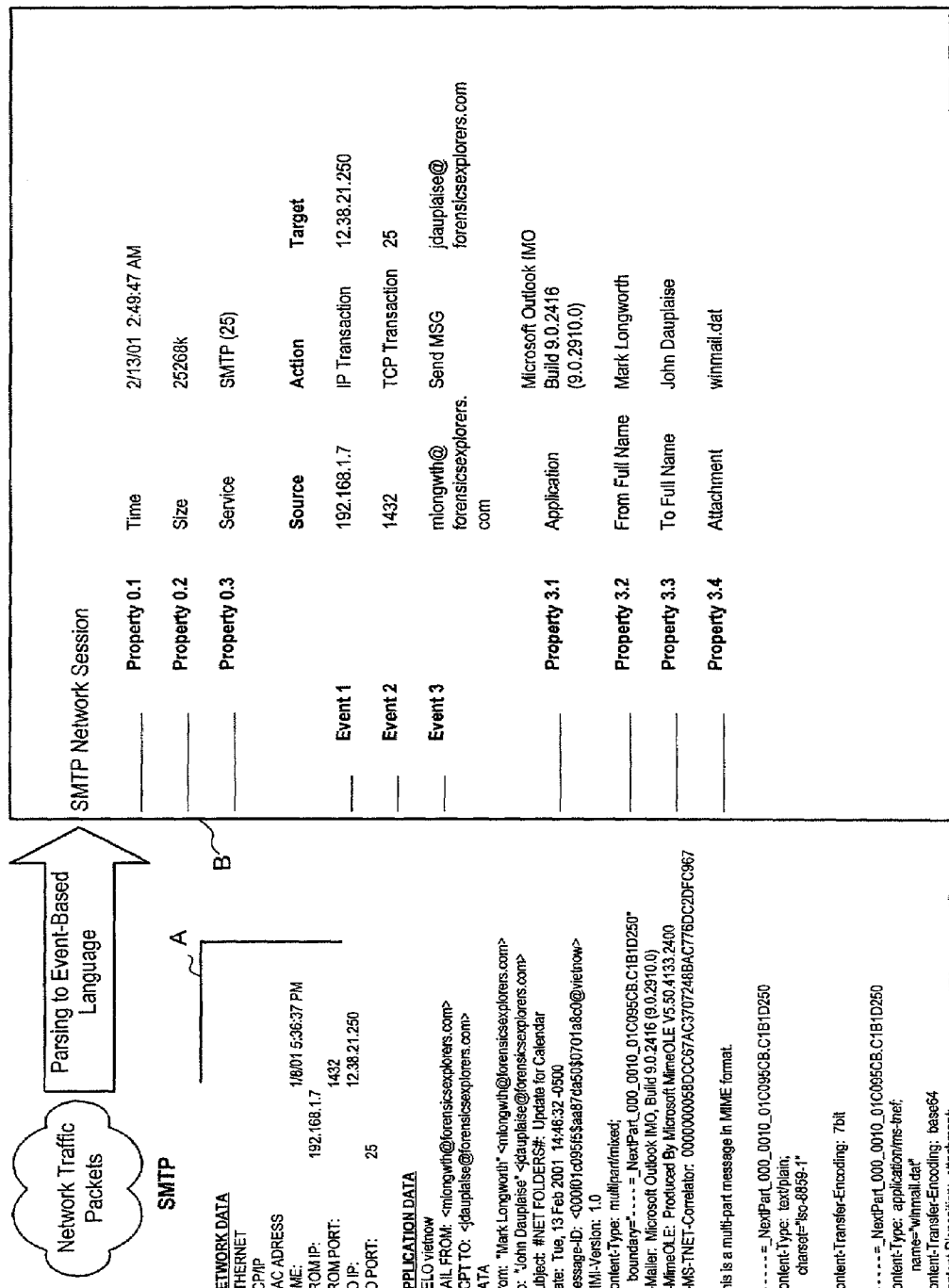
FIG. 7 illustrates an exemplary generation of an event-based language corresponding to an email session in accordance with the present invention.

FIG. 7 illustrates an example of the present invention to parse an SMTP (Simple Mail Transfer Protocol) session into the event-based language. In FIG. 7, the area "A" displays data from the session in protocol, which consists of multiple data packets for an e-mail that was sent from one user to another. The session includes network-level data (e.g., Ethernet and TCP/IP) and application data (e.g., SMTP and Microsoft Outlook).

Area "B" displays the metadata that describes the session according to the event-based language. The overall SMTP session is described by four properties: time, size, service, and subject (not shown). The session includes three separate events: (1) a first event between the source computer (entity) and the target computer (entity) for an IP transaction (action); (2) a second event between the port (entity) of the source computer and the port (entity) of the target computer for a TCP transaction (action); and (3) a third event between the source user (entity) and the target user (entity) for sending a message (action). The service type (SMTP) is not separately recited for each of the events because it is the same for all events in the session.

Properties of the third event are also identified. The properties include the identity of the application (MS Outlook) and the attached file (winmail.dat).

Figure 8:
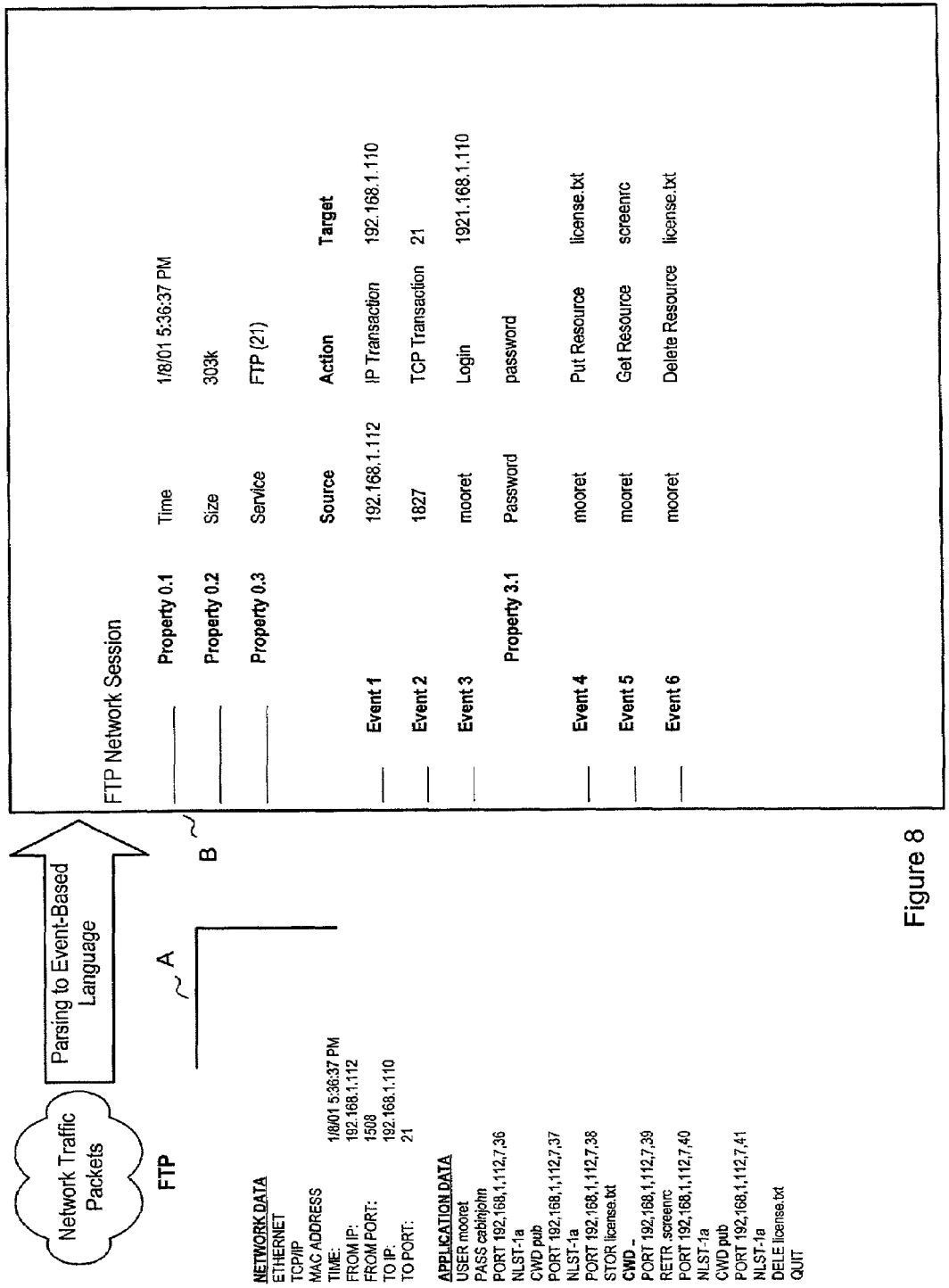
FIG. 8 illustrates an exemplary generation of an event-based language corresponding to a file transfer session in accordance with the present invention.

FIG. 8 illustrates an example of applying the present invention to parse an FTP (File Transfer Protocol) session into the event-based language. In the session of FIG. 8, a user has logged into a site, stored a file, retrieved some data, and then deleted the file. In area "A" of FIG. 8, network-level data and application data from the packets and within the session are shown. By application of the invention, the session is translated into metadata conformed to the event-based language shown in area "B."

FIGS. 7 and 8 provide an exemplary illustration of the benefits of the invention. The protocol-specific data in area A for both figures is complex and unwieldy. More importantly, the extracted data for the SMTP session (shown in FIG. 7) is very different from the extracted data for the FTP session (shown in FIG. 8). Additionally, the extracted data (area A) is not readily or easily understood in terms of the events that took place. Without the present invention, logs of SMTP sessions and FTP sessions would require separate analysis tools to be analyzed.

When a session is converted to metadata conforming to the event-based language (as shown in areas B of FIGS. 7 and 8), the network-level events are readily understood. The metadata for different protocols (here, SMTP and FTP) can be stored in the same finite set of tables in a log or record. Importantly, the same analysis tool or tools can be used to analyze both types of sessions.

FIGS. 10, 11a, and 11b provide a record of an exemplary embodiment of data from protocol-specific sessions. FIG. 10 illustrates data from a session conforming to the HTTP protocol. FIG. 11a illustrates data from a session conforming to the SMTP protocol. FIG. 11b illustrates data from a session conforming to the FTP protocol.

FIG. 12a illustrates a log output file of the three sessions illustrated in part in FIGS. 10, 11a, and 11b after they have been parsed into metadata conformed to the event-based language of the present invention. The metadata for the first session is represented in the first seven lines of the exemplary log output file. The metadata for the second session is represented in lines eight to eighteen of the exemplary log output file. The metadata for the third session is represented in lines nineteen to twenty-three of the exemplary log output file. This output follows the form shown in FIG. 12b.

In FIG. 12b, the terms shown after the "S:" relate to types of metadata about a session of data from which an event is a part. The terms shown after the first two "P:" relate to metadata about properties of the session of data. The terms shown after the "E:" relate to types of metadata about the event. The terms shown after the "P:" below the "E:" relate to types of metadata about properties of the event. For example, "<source name:subname>" and "<target name:subname>" are entities involved in event. The terms shown after the "A:" relate to types of metadata about an alias or aliases of these entities. The terms after the "R:" relate to types of metadata about the route or routes taken by the session of data or the data packets that comprise the session. As can be readily seen, the output of this exemplary embodiment of the invention shows parsing of sessions in disparate protocols into a compact output conforming to a common language.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations of the invention.

What is claimed is:

1. A method of extracting information from a network session comprising a plurality of packets to create a record conforming to an event-based language comprising the steps of:
    receiving a session comprising a plurality of packets that have previously been exchanged in a session between a first entity and a second entity;
    extracting information from the session;
    translating the information into an event statement describing an event between a first entity and a second entity;
    creating a record containing the event statement, wherein the event statement describes an application used for the event, and an action describing the event;
    further translating the information into a session statement describing the session of which the event is a part, wherein the record also contains the session statement;
    translating the information into a property statement describing properties of the event, wherein the record also contains the property statement;
    translating the information into a route statement describing a route through a network traveled by the event, the session or a part of the session, wherein the record also contains the route statement;
    translating the information into an alias statement describing additional information related to an identity of the first entity or the second entity, wherein the record also contains the alias statement;
    wherein the record is a condensed and simple representation of the session from which the information was extracted,
    wherein at least the translating steps are preformed in an analyzer that is in communication with a parser.

2. The method of claim 1, wherein the first entity and the second entity comprise one of the following entities: IP, IP-port, IP-user, IP-resource, host, host-port, host-user, or host-resource.

3. The method of claim 1, wherein the event statement describes the first entity and the second entity.

4. The method of claim 3, wherein the record conforms to the following structure:
    "<the first entity> was seen <the action> to <the second entity> with <the application>."

5. The method of claim 3, wherein the application is one of the following application types: FTP, Telnet, SMTP, Domain Name Service, DHCP, AOL™ Instant Messenger, Yahoo™ Instant Messenger, HTTP, POP-2, POP-3, NNTP, Microsoft RPC, Netbios, MS File Access, SNMP, RIP, MS Instant Messenger, Lotus Notes™, Sybase™ Database, MSSQL™ Database, Oracle™ Database, Lotus Sametime™, Unix™ File Access, or IRC.

6. The method of claim 3, wherein the event statement further contains one of the following content types: Mail, HTML, DCARD, SMIME, or PGP.

7. The method of claim 3, wherein the action includes at least one of the following action types: User Login, User Logoff, Get Resource, Put Resource, Delete Resource, Send Message, Receive Message, Read Message, Delete Message, Database Query, User Login Response, User Logoff Response, Get Resource Response, Delete Resource Response, Send Message Response, Read Message Response, or Database Query Response.

8. The method of claim 1, wherein the properties of the event include at least one of the following property types: an application used, a subject of the event, or a database queried.

9. The method of claim 1, wherein the alias statement contains at least one of the following alias types: IP-Alias or User-Alias.

10. The method of claim 1, wherein the record includes metadata about the session.

11. The method of claim 10, wherein the record includes metadata about properties of the session.

12. The method of claim 11, wherein the metadata about properties of the session comprises a global property name.

13. The method of claim 1, wherein the session statement comprises times that the session of which the event is a part began and ended, a size of the session and a service type of the session.

* * * * *